UNITED STATES PATENT OFFICE.

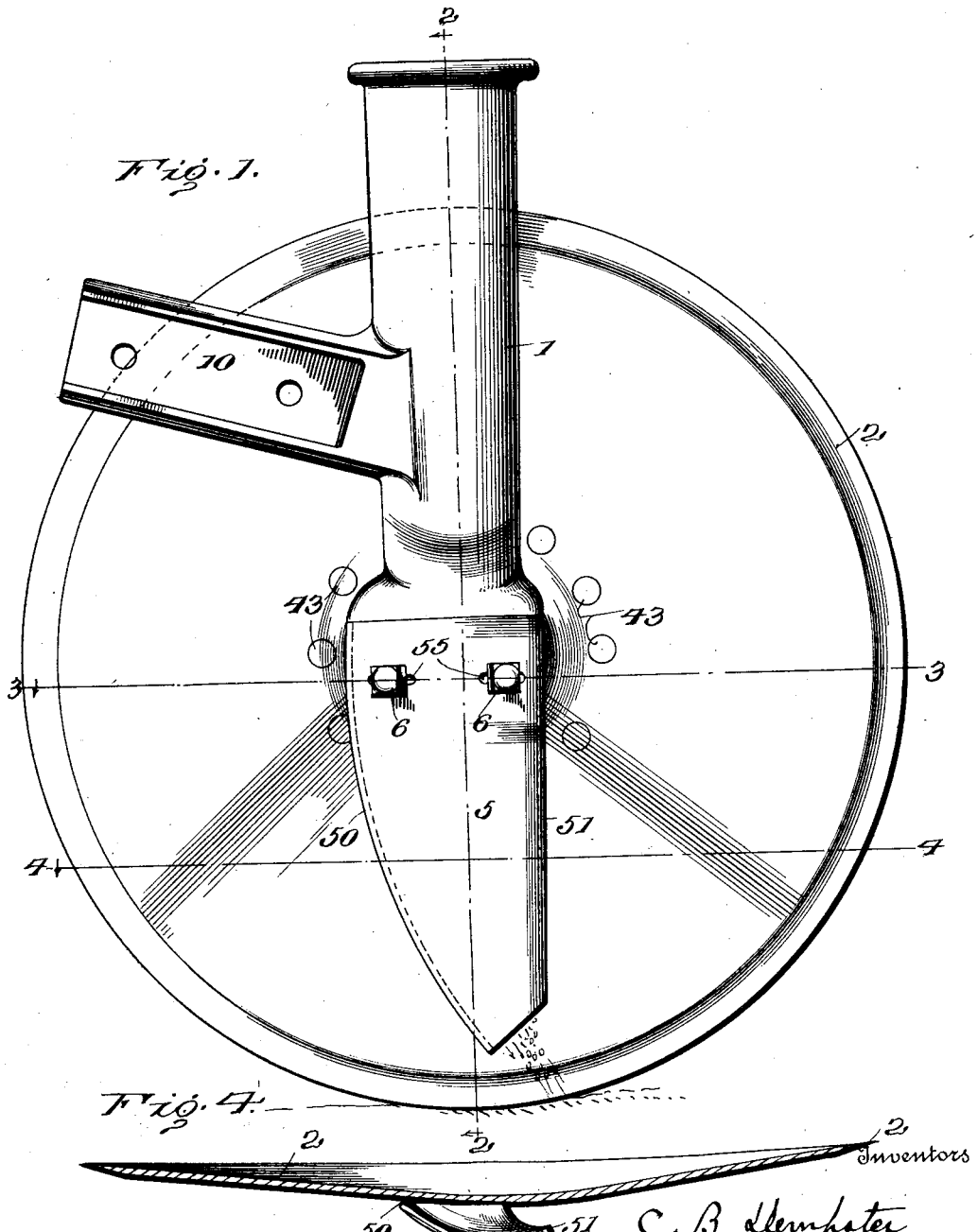

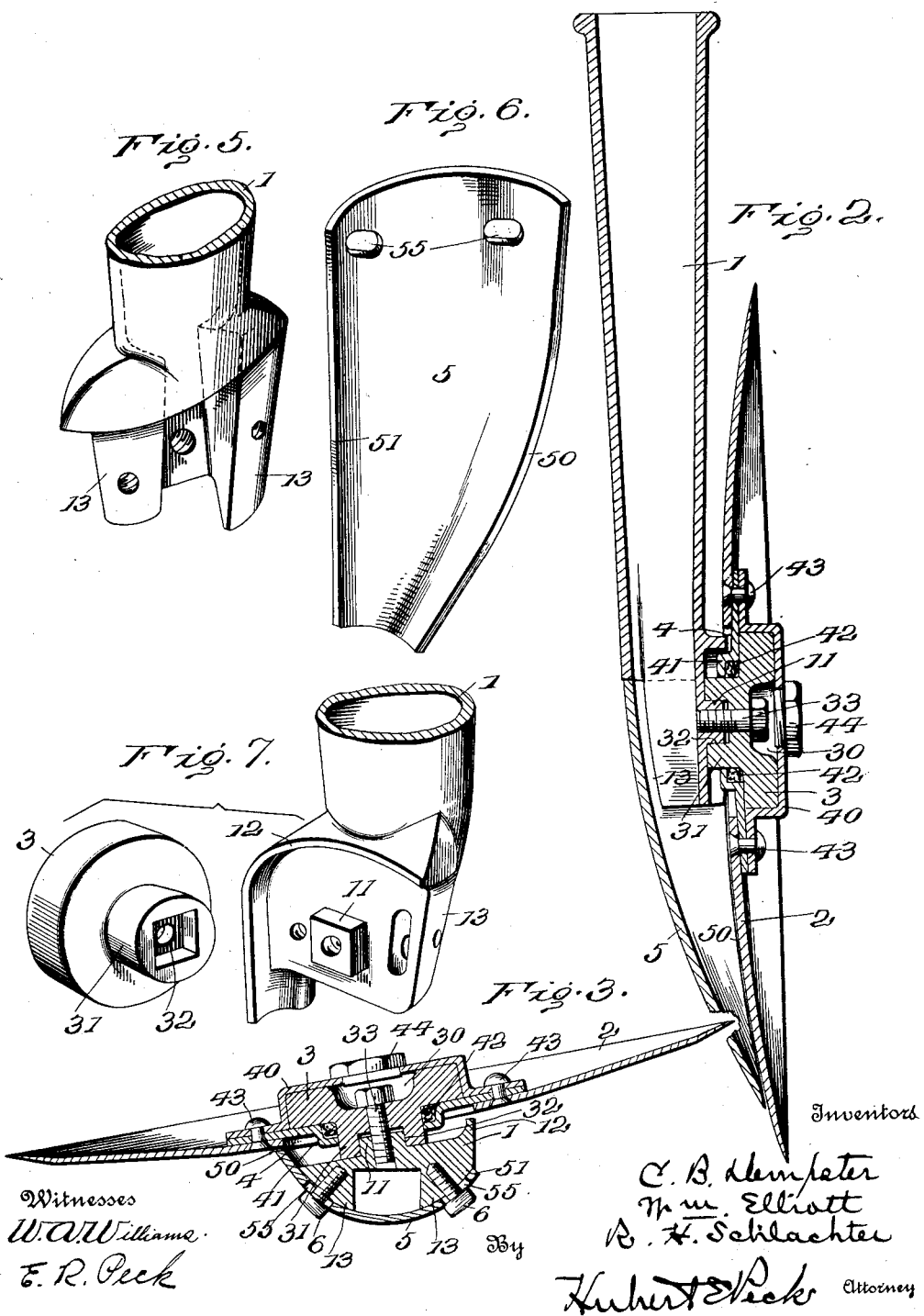

CHARLES B. DEMPSTER, WILLIAM ELLIOTT, AND ROBERT H. SCHLACHTER, OF BEATRICE, NEBRASKA, ASSIGNORS TO DEMPSTER MILL MANUFACTURING COMPANY, OF BEATRICE, NEBRASKA, A CORPORATION OF NEBRASKA.

SINGLE-DISK GRAIN-DRILL.

1,085,551. Specification of Letters Patent. Patented Jan. 27, 1914.

Application filed April 17, 1912. Serial No. 691,477.

*To all whom it may concern:*

Be it known that we, CHARLES B. DEMPSTER, WILLIAM ELLIOTT, and ROBERT H. SCHLACHTER, citizens of the United States, residing at Beatrice, in the county of Gage and State of Nebraska, have invented certain new and useful Improvements in Single-disk Grain-Drills, of which the following is a specification.

This invention relates to certain improvements in grain drills and more particularly to improvements in and relating to single disk center delivery grain drills; and the objects and nature of the invention will be readily understood by those skilled in the art in the light of the following explanation of the accompanying drawing illustrating what we now believe to be our preferred embodiment from among other formations and arrangements within the spirit and scope of the invention.

It is an object of the invention to provide a single disk center delivery grain drill with certain improvements whereby the grain will be delivered at a point approximately directly below the disk axis and at the lowest portion of the disk edge and hence substantially into the deepest portion of the furrow or directly into the bottom of the furrow approximately beside said lowest portion of the disk edge whereby the seed can be deposited at the required depth without setting the disk to cut deeper than said required depth.

A further object of the invention is to provide a single disk grain drill with an open shield forming a scraper in connection with means whereby said shield can be adjusted to maintain the cleaning or scraping relation with respect to the disk.

A further object of the invention is to provide a grain drill having a disk furrow opener with an improved center delivery open shield at its front edge fitting the disk to exclude trash and the like.

A further object of the invention is to provide certain improvements in arrangements and combinations of parts and in formation and construction of elements whereby an improved and highly efficient single disk center delivery grain drill will be produced.

The invention consists in certain novel features in construction and in combinations and arrangements as more fully and particularly set forth and specified hereinafter.

Referring to the accompanying drawings:—Figure 1, is a side elevation. Fig. 2, is a vertical section on the line 2—2, Fig. 1. Fig. 3, is a horizontal section on the line 3—3, Fig. 1. Fig. 4, is a horizontal section on the line 4—4, Fig. 1. Fig. 5, is a detail perspective of the lower outer side portion of the boot. Fig. 6, is a detail perspective of the shield showing the inner or concave side thereof. Fig. 7, is a detail perspective of the lower inner side portion of the boot, showing the disk bearing block separated therefrom.

In the drawings, we show a vertically disposed approximately straight hollow boot 1, formed or provided with means 10, for the attachment of the drag bar, as will be readily understood by those skilled in the art. This boot carries a single cutter, or furrow opening disk 2, located beside the boot and rotatable on an axis arranged transversely of the boot and at the lower end thereof. The boot extends downwardly at the convex or landside of the disk, and at its lower end the boot is provided with a suitable bearing or journal for the disk. In the specific example illustrated, this bearing consists of a circular or disk-like bearing block 3, having a central depressed recess 30, in its outer face or end and a reduced central or concentric cylindrical boss or neck 31, projecting laterally from its opposite or inner side or end. The outer end face of this cylindrical concentric boss 31 is formed with a depressed squared or angular socket 32, to receive the correspondingly shaped lug 11, rigid with the boot and projecting laterally from the side face of the lower end of the boot. The end face of the boss 31, abuts against the side face of the boot around the lug 11. The lug fits the socket in the boss end and holds the bearing block against rotation. The bearing block is removably secured and clamped to the boot by a bolt 33, passing removably and centrally through the bearing block and screwing into the lug and boot. The head of the bolt is located and accessible in the recess 30, in the outer end of the bearing block. The cylindrical boss 31, maintains the enlarged cylindrical or circular portion of the bearing block spaced laterally a distance from the side of the boot.

The cutter or disk is carried by and provided with a central journal box receiving and rotatable on said block and whereby the disk is confined to the boot and in proper position with respect thereto to move forward therewith at the desired furrow forming angle. This journal box is arranged at the concave side of the disk and consists of a pair of circular parallel plates 4, 40, between which the bearing block is confined, the circumferential edge portions of the plates beyond the circumference of the block being riveted, or otherwise rigidly secured together and to the rotary disk. The central portion of the disk is removed or formed with an enlarged central opening. The plate 4, spans the opening in the disk and forms the inner wall of the box and abuts the inner end or side of the bearing block, and is formed with a central opening snugly receiving the cylindrical boss 31, of the bearing block and rotating thereon. The central portion of the plate 4, around the opening therein, is depressed or dished outwardly or in a direction away from the adjacent face of the bearing block, see 41, to form an annular socket receiving packing ring 42, located at the angle between the boss and side face of the block and forming a comparatively tight seal for the retention of lubricant and for the exclusion of grit and the like. The plate 40, forms the outer wall of the box and abuts the outer end or face of the bearing block and is centrally dished to embrace and fit the circumference of said block and to provide the exterior flange fitting down on the outer edge portion of plate 4, resting flat against the concave face of the disk, and to receive the transverse securing rivets 43. The center of the plate 40, is formed with an opening into recess 30, for oiling and for access to bolt 33, and this opening is normally tightly closed by a suitable cap or plug 44, a screw cap being usually employed for this purpose. The journal box forms a permanent part of the disk and the bearing block is permanently confined in said box, and these parts can be readily removed from the boot when bolt 33, has been unscrewed from the boot. This bolt turns freely in the bearing block and screws into a threaded hole in the boot and merely serves to tightly clamp said block to the boot.

If so desired, the boot can be formed with a guard flange or deflector 12, at its rear side next to the disk to deflect dirt from the boss 31, and the dished center of plate 4, rotating on said boss. The lower open end of the boot proper terminates about opposite the central portion of the convex side of the rotary disk and is spaced laterally a distance therefrom, so that the seeds drop vertically through the boot and from the lower open end thereof. The seeds drop from the boot onto (or into the passage formed by) a shield 5, forming a downward approximately vertical continuation of the seed passage of the boot along the convex side of the disk and discharging beside approximately the lowest portion of the disk. This shield is concavo-convex in cross section and from its upper end longitudinally curves or inclines downwardly and inwardly toward the surface of the disk. The shield can be composed of a single steel (or other material) blade having its front longitudinal edge 50, formed throughout its length to fit the convex surface of the disk and constitute a scraper for scouring said surface of the disk and for preventing passage of trash or the like into the seed passage formed between the shield and surface of the disk. The usually straight vertical rear longitudinal edge 51, of the shield is preferably spaced a distance from the surface of the disk so as to leave the said seed passage open at the rear from the lower end of the boot down to the point of the shield formed by the lower end of the scraper edge 50. The edge 50 usually curves downwardly and rearwardly and is usually transversely ground off or beveled to provide a comparatively wide edge closely fitting the surface of the disk and to form a sharp or knife front edge to scrape and scour the surface of the rotating disk as it travels rearwardly in close contact with said front edge portion of the shield. The seeds are guided and confined by this shield to drop from the lower open end thereof just in rear of the rearwardly deflected lower end of the edge 50, and beside the lowermost portion of the disk and hence directly onto the very bottom of the furrow approximately as said lowermost portion of the disk completes the cut forming the furrow. The shield extends down to within a short distance of the lowermost edge portion of the disk directly below the axis of the disk. The arrangement is such that the disk can be set to cut to a depth equal to the depth at which the seeds are to be planted thereby reducing the draft required where the disk must cut to a greater depth than that at which the seeds are to be planted.

It is desirable to maintain the front longitudinal edge of the shield approximately throughout its length in contact with the surface of the disk for the purposes of scouring the surface of the disk and excluding trash from the seed passage between the shield and disk. If this edge of the shield becomes separated from the surface of the disk trash is liable to work in between the disk and shield and not only stop the rotation of the disk but also clog and choke the seed passage. We hence provide means whereby the shield can be readily adjusted to constantly maintain the desired fit between the shield and disk. In the example illustrated, the transversely concaved inner face of the upper or large end of the shield fits correspondingly transversely curved or convexed outer surface or surfaces 13, of the lower end of the boot so that the front scraping edge of the shield can be moved to and from the surface of the disk by bodily sliding the shield transversely on said rounded seat 13. The shield depends from and is secured to and carried by the boot, and in the specific example illustrated, headed bolts 6, are employed for this purpose. These bolts extend inwardly through slots 55, in the upper portion of the shield and elongated transversely thereof, and screw into threaded holes in the lower portion of the boot, with the bolt heads exposed and readily accessible at the exterior of the shield and designed to tightly clamp the shield against the convexed seat of the boot. On loosening the bolts, the shield can be adjusted transversely to bring its front edge into the desired close contact with the surface of the disk, and the bolts can then be easily tightened to lock the shield in the desired adjustment.

It is evident that various changes, variations, and modifications might be resorted to in the forms, constructions, arrangements and combinations set up without departing from the spirit and scope of our invention, and hence we do not wish to limit ourselves to the exact disclosure hereof but consider ourselves entitled to all such departures and equivalents as fall within the spirit and scope of our invention.

What we claim is;—

1. In combination, a boot having a transversely curved portion, a rotary disk arranged at the inner side of the boot and carried thereby, and a vertically disposed transversely concaved blade adjustably secured to said curved portion of the boot and depending therefrom along the surface of the disk from its central portion to the lower edge portion thereof to guide the seeds dropping from the boot and deliver the same into the furrow, said boot and blade being arranged in the plane of the vertical diameter of the disk, the front longitudinal edge of said blade conforming to the surface of the disk and to engage and scour the same and prevent access of trash to the seed passage.

2. In combination, a boot at the inner side of its lower end having a bearing, a rotary disk arranged at the inner side of the boot and mounted on said bearing, said boot at its outer side having a seat convexed transversely of the boot, a blade transversely concaved at its inner side and fitted on said seat, means securing said blade to said boot and providing for transverse sliding adjustment of the blade on said seat, said blade having its concaved side next to the disk and extending from the boot to the lower edge portion of the disk and having its front longitudinal edge forming a scraper and adapted to engage the surface of the disk, said blade forming a direct downward continuation of said boot in the plane of the vertical diameter of said disk.

3. In combination, in a single disk grain drill, a boot having a bearing, a rotary furrow-opening disk mounted on said bearing, said boot having a seat curved transversely thereof, a blade vertically and centrally arranged with respect to the axis of rotation of said disk and forming a direct downward continuation of the seed passage of said boot along the side surface of the disk approximately to the lowest portion thereof directly below the seed passage of the boot and having its front longitudinal edge curved to conform to the curvature of the disk and transversely ground to abut the surface of the disk and form a scraper, said blade having a transversely curved portion engaging said seat, and means securing said blade to said boot and providing for sliding adjustment of the blade on said seat.

4. A single-disk center-delivery grain drill comprising a vertically-disposed boot having a bearing block arranged entirely at the inner side of its lower end, a furrow-opening disk mounted on said block and arranged at the inner side of the boot, a vertically-disposed shield forming a downward continuation of said boot along the outer surface of the disk and extending approximately to the lowermost edge portion of the disk, said shield being composed of a blade concaved at its inner surface to form a grain passage along the surface of the disk, and means adjustably securing the upper end of the blade to the lower end of the boot and providing for transverse adjustment of the blade to maintain its front edge in operative relation with the surface of the disk, the seed passage formed by the boot and blade being approximately arranged in the plane of the vertical diameter of the disk.

5. A single-disk center-delivery grain drill comprising a vertically-disposed boot, a furrow-opening disk mounted at the inner side of the lower end of the boot, the grain passage within the boot being approximately vertical and centrally arranged with respect to the axis of rotation of the disk, and a shield secured at its upper end to the lower end of the boot and providing a grain passage in vertical continuation of the grain passage of the boot and extending along the surface of the disk with a discharge approximately at the lowest portion of the disk, said shield composed of a concaved blade having its front longitudinal edge curved to form a scraper along the surface of the disk, means being provided for permitting transverse adjustment of the blade on the boot, without disturbing the vertical relation of the blade, to maintain the operative relation between the front edge of the blade and the surface of the disk.

6. A single-disk center-delivery grain drill comprising a vertically disposed boot; a furrow-opening disk mounted at the inner side of the lower end of the boot; the bearing for said disk being located entirely at the inner sides of the boot and disk, the grain passage within the boot being approximately vertical and centrally arranged with respect to the axis of rotation of the disk and located in the plane of the vertical diameter of the disk, and a shield secured at its upper end to the lower end of the boot and providing a grain passage in continuation of the grain passage of the boot along the surface of the disk with a discharge approximately at the lowest portion of the disk, said shield composed of a concaved blade having its front longitudinal edge forming a scraper along the surface of the disk.

7. A single-disk center-delivery grain drill comprising a support having a vertically disposed seed passage, a bearing block carried by and arranged at one side of said support, said support at its opposite side having a seat, a rotary disk mounted on said block, and a depending transversely-concaved blade fitting and transversely adjustable on and normally fixed to said seat with its front longitudinal edge coöperating with the surface of said disk to form a scraper, said blade forming a seed passage extending from the seed passage of said support along the surface of the disk to the lower edge portion thereof, said seed passage being vertically and centrally arranged with respect to the axis of rotation of said disk.

8. In a single-disk center-delivery grain drill, in combination, a boot, a furrow-opening disk carried thereby and arranged beside the same, a blade extending from the boot along the disk to the lower edge portion thereof, said blade being transversely concaved at its inner side to form a seed passage along the surface of the disk from the seed passage of the boot and vertically and centrally arranged with respect to the axis of rotation of the disk, the rear longitudinal edge of the blade being approximately straight and vertical and spaced from the surface of the disk, the front longitudinal edge of the blade being longitudinally curved inwardly and rearwardly to conform to the curvature of the disk and to engage the same in scraper relation, and means whereby said blade can be transversely adjusted with respect to the boot to maintain the scraper relation between the front edge of the blade and the surface of the disk.

9. In a grain drill, in combination, a boot provided with a bearing block arranged at the inner side of its lower end, a rotary disk confined by and rotating on said block and held thereby spaced from the boot, a blade depending from the boot along the surface of said disk to the lower edge portion thereof and concaved at its surface next to the disk to form a seed passage from the boot discharging at the central lower edge portion of the disk directly below the seed passage of the boot, the front longitudinal edge of said blade adapted to engage the surface of the disk to form a scraper, the transversely curved upper portion of the blade fitting and transversely adjustable on the lower end of the boot opposite the central portion of the disk and having a slot elongated transversely of the blade, and a securing bolt passing through said slot and clamping the blade to the boot.

10. A single-disk center-delivery grain drill comprising a boot, a rotary disk carried thereby, said boot at its lower end having a transversely curved seat, a shield depending from said boot along the surface of the disk and forming a grain passage in downward continuation of the passage of the boot and vertically and centrally arranged with respect to the axis of rotation of said disk, said shield composed of a downwardly-tapered vertically-elongated scraper-forming narrow concaved blade at its transversely curved upper end fitting and slidably adjustable on said seat, and means for adjustably securing said blade to said seat and against vertical movement with respect to the boot.

11. A single-disk center-delivery grain drill comprising a rotary furrow-opening disk, a seed tube forming a boot and arranged entirely at the land side of said disk, the inner side wall of the seed passage of said tube provided with and carrying an exterior bearing on which said disk is mounted, whereby said seed passage traverses the axial line of rotation of said disk and is not obstructed thereby, and a vertical scraper-forming longitudinally-concaved blade depending from the lower end of said tube along the land side of said disk approximately to the lower edge of said disk, and forming a seed passage arranged in the plane of the lower vertical radius of the disk and in downward continuation of the seed passage of said tube.

12. A single-disk grain drill comprising a seed tube, forming a boot, provided with an exterior bearing, a furrow opening disk arranged on and carried by said bearing, the outer side of the lower end of said tube being transversely rounded to form a convexed seat, a scraper-forming blade formed to constitute a downward continuation of the seed passage of said tube along the surface of said disk approximately to the lower edge portion thereof, the upper end of said blade being concaved to receive said rounded outer side of the lower end of said tube, the front longitudinal portion of said blade transversely extending directly inwardly toward the surface of the disk to squarely abut the front longitudinal edge of the blade against the surface of the disk for excluding trash from the seed passage between the blade and disk, said blade being bodily rotatable on said end of said tube to adjust said edge to squarely abut the surface of the disk without substantial bodily forward movement of the blade along the disk, and means for rigidly securing said blade to said tube and in the desired adjustment.

In testimony whereof we affix our signatures in presence of two witnesses.

CHARLES B. DEMPSTER.
WILLIAM ELLIOTT.
ROBERT H. SCHLACHTER.

Witnesses:
R. H. YALE,
V. O. RANKIN.

Copies of this patent may be obtained for five cents each, by addressing the "Commissioner of Patents, Washington, D. C."